United States Patent [19]
Gilbert

[11] Patent Number: 5,458,304
[45] Date of Patent: Oct. 17, 1995

[54] DISK SPOILER SYSTEM

[76] Inventor: Raymond D. Gilbert, 6501 Inwood Dr., Springfield, Va. 22150

[21] Appl. No.: 158,749

[22] Filed: Nov. 26, 1993

Related U.S. Application Data

[62] Division of Ser. No. 935,284, Aug. 26, 1992, Pat No. 5,445,346.

[51] Int. Cl.⁶ ................. B64C 5/10; G05D 1/00
[52] U.S. Cl. .............. 244/90 B; 244/90 A; 244/184; 244/195
[58] Field of Search .............. 244/90 R, 90 B, 244/90 A, 184, 195

[56] References Cited

U.S. PATENT DOCUMENTS

| | | |
|---|---|---|
| 2,410,855 | 11/1946 | Koppen . |
| 2,450,709 | 10/1948 | Beman ................... 244/90 A |
| 2,480,040 | 8/1949 | Mitchell ................. 244/90 A |
| 2,484,359 | 10/1949 | Tipton ................... 244/90 B |
| 2,639,875 | 5/1953 | Vogel . |
| 2,861,756 | 11/1958 | Feucht et al. ............. 244/76 |
| 3,589,648 | 6/1971 | Gorham . |
| 3,618,878 | 11/1971 | Klein . |
| 3,945,593 | 3/1976 | Schänzer . |
| 4,236,685 | 12/1980 | Kissel ..................... 244/195 |
| 4,363,098 | 12/1982 | Buus et al. ............... 244/90 A |
| 4,479,620 | 10/1984 | Rogers et al. ........... 244/90 R |
| 4,591,113 | 5/1986 | Mabey ................... 244/76 C |
| 4,706,902 | 11/1987 | Destuynder et al. ....... 244/195 |
| 4,744,532 | 5/1988 | Ziegler et al. ............ 244/75 R |
| 4,796,192 | 1/1989 | Lewis ..................... 244/90 R |
| 4,964,599 | 10/1990 | Furineau .................. 244/195 |
| 5,008,825 | 4/1991 | Nadkarni et al. .......... 244/178 |
| 5,060,889 | 10/1991 | Nadkarni et al. .......... 244/184 |
| 5,082,207 | 1/1992 | Tulinius .................. 244/195 |
| 5,127,608 | 7/1992 | Farineau et al. .......... 244/195 |
| 5,135,186 | 8/1992 | Ako ....................... 244/195 |

*Primary Examiner*—David M. Mitchell
*Assistant Examiner*—Virna Lissi Mojica

[57] ABSTRACT

Spoilers, mounted on vertical stabilizer tail surfaces of large aircraft release controllable Bernoulli forces to augment rudder and aileron aircraft controls. Data from surface pressure sensors, also mounted on vertical stabilizer tail surface, is computer-interpreted to minimize tail drag and structural flight-stress. The spoilers suitable for this role include parallel lines of controllable height barriers, located on the fore part of each side of symmetrical airfoils of airplane tails.

3 Claims, 2 Drawing Sheets

DISK SPOILER SYSTEM

CROSS-REFERENCES TO RELATED APPLICATIONS

This is a division of U.S. Pat. Ser. No. 935,284, filed Aug. 26, 1992, now U.S. Pat. No. 5,445,346.

Statement as to rights to inventions made under Federally-sponsored research and development: None

BACKGROUND OF THE INVENTION

1. Field of the Invention

This invention relates to reduction of ddrag and transient oscillation of an aircraft vertical stabilizer tail member, and more specifically to use of a perpendicular-to-surface, forward-mounted spoiler-barrier having aft surface pressure sensors and a computer feedback system.

2. Description of Prior Background

Control over aircraft attitude is essential to flight and landing. Primary attitude airfoils are at the tail of an airplane. With increased airspeeds and aircraft sizes, elevators continue to be a primary pitch control and vertical rudder systems continue to be primary azimuth control. These tail surfaces are cantilever structures whose cross sectional thickness is usually covered with a symmetrical airfoil.

Spoilers of a fence-type dramatically enhanced top wing lift stability on the WWII Northrop P-61 as they replaced ailerons for this large fighter aircraft.

In-flight adjustable fence-barriers and hinge spoilers on wing-top airfoils steepen glide path and increase sink rate. (U.S. Pat. No. 2,410,855 Koppen) Powered hinge spoilers are mounted on the aft portion of heavy commercial aircraft wings to kill lift and induce added drag.(U.S. Pat. NO. 3,618,878)

Communication means for communicating control forces from pilot to aircraft airfoils are cited in text books, information manuals and periodicals, including those from the Experimental Aircraft Association.

Vogel, U.S. Pat. No. 2,639,875, illustrates routing of tension members between cockpit and elevator, and discloses a means for augmenting stick forces.

Reucht et al, U.S. Pat. No. 2,861,756 considered override important for the Bendix type automatic pilot in 1958.

SUMMARY OF THE INVENTION

This invention mounts air-pressure sensor-controllable spoilers on each side of airfoil surfaces. Lines of disk-spoilers, mounted forward of the airfoil center can enhance efficiency for fixed wing airplanes.

Normally, both sides of a symmetrical airfoil are subject to reduced surface pressure due to the Bernoulli effect of lowered pressures in areas experiencing higher air velocities such as over airfoil surfaces.

Spoilers interrupt normal laminar airflow of the Bernoulli "lift" effect. Concurrently, the unspoiled airfoil surface of the opposite, symmetrical airfoil retains its lower pressure to generate a lift normal to the surface of the airfoil.

The drag induced from Bernoulli lift forces, generated from its pressure drop is proportional to the square of the air velocity. Therefore, "lift-drag" is minimized when air velocity is equal on each side of a symmetrical airfoil.

Computer means for optimizing aircraft flight use data from surface-pressure sensors, with software algorithms, and amplifiers to provide electrical signal output to operate an electromechanical spoiler actuating apparatus. A typical comparison and feedback software is like a non-skid brake algorithm, and is shown in FIG. 5.

Its method steps might be:

A. Sense surface pressure on left and right side of airfoil,

B. Subtract low from high value sensor output,

C. Convert sensor value difference to time exposure of spoilers at barrier height levels, D. Actuate spoiler to selected height level, E. Hold spoiler at height and return to below surface, F. Repeat cycle A–E.

An efficiency enhancement outfits a cantilevered vertical stabilizer structure with vertical arrays of spoilers, and with surface pressure sensors positioned on aft sides of the aircraft's vertical stabilizer.

As a difference in surface pressure is sensed and compared, spoiler barriers are extended on the high velocity side of an airfoil to rebalance the relative drag. This combination system of sensors, computer and adjustable spoilers offset transient oscillations of tail structures in flight.

DESCRIPTION OF THE PREFERRED EMBODIMENTS

Figure 1:
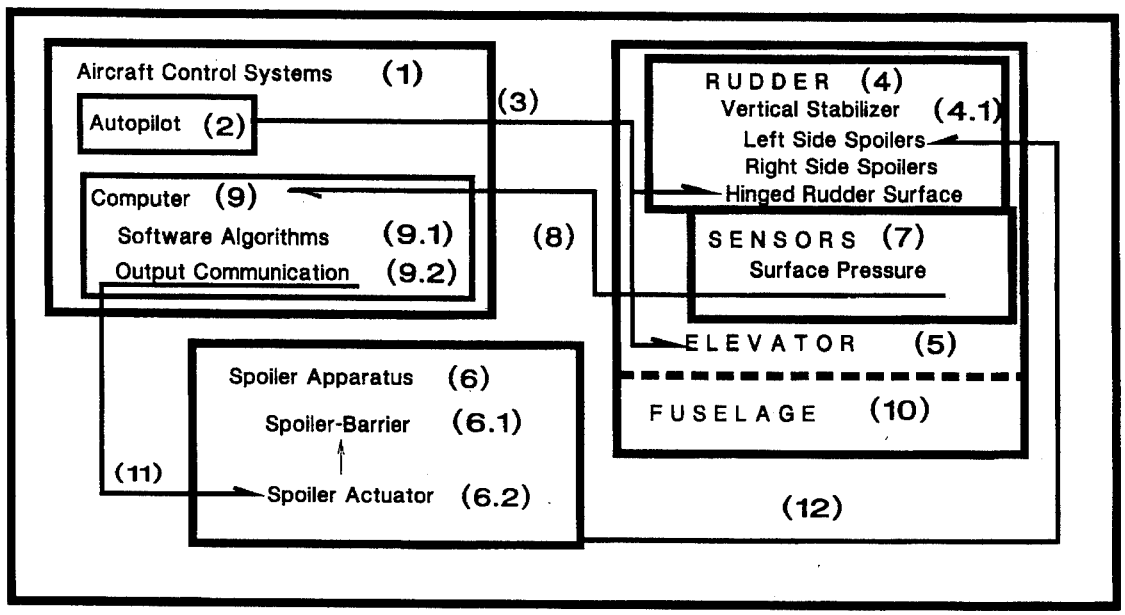
FIG. 1 is a block diagram of spoiler-linked Vertical Stabilizer Surfaces.
Figure 2:
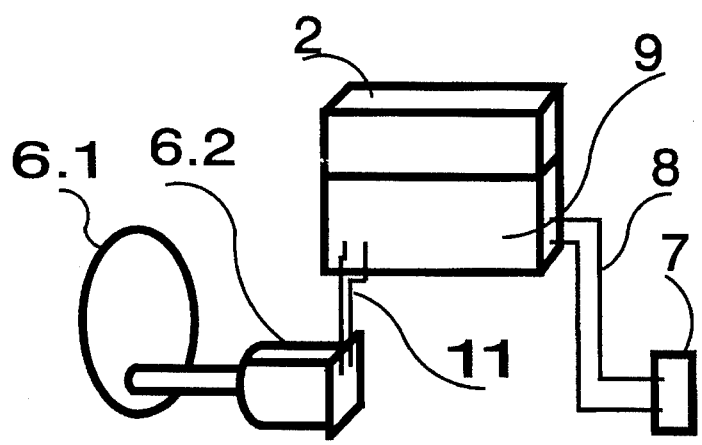
FIG. 2 is a diagram of a Spoiler, Computer and Sensor.
Figure 3:
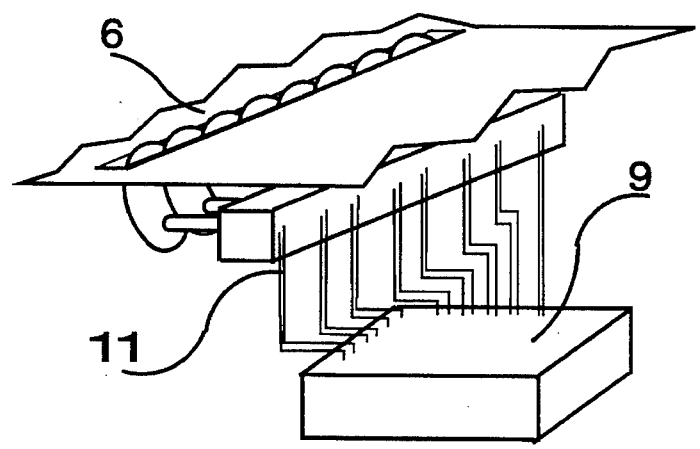
FIG. 3 is a Spoiler Array, computer driven.

Control systems (FIG. 1-1) for large aircraft include autopilot (FIG. 1-2) with communication (FIG. 1-3) to rudder (FIG. 1-4) surface systems.

Spoiler apparatus (FIG. 1-6) are mounted at each side of vertical stabilizers (FIG. 1-4.1).

Figure 4:
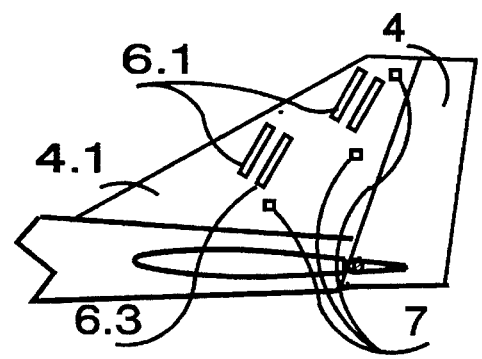
FIG. 4 is a sketch of Spoiler Array and Sensor Locations for aircraft vertical tail surfaces.
Figure 5:
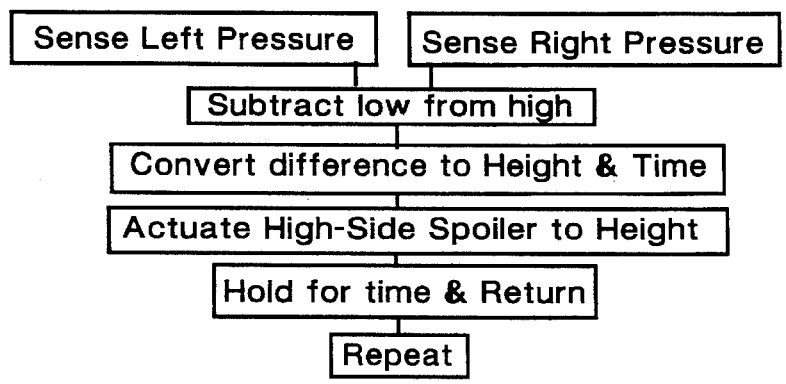
FIG. 5 is a method diagram of Azimuth Optimization

A spoiler apparatus (FIG. 3-6) is co-located on vertical tail surfaces (FIG. 4-4.1) with aft-mounted surface pressure sensors (FIG. 1-7, 2-7 & 4-7), which have communicating lines (FIG. 1-8) with computer means to shed aircraft drag and to damp Stress-inducing oscillations of the aircraft's fuselage (FIG. 1-10) and cantilevered vertical tail structures (FIG. 4-4.1).

Spoiler barriers, (FIG. 1-6.1), computers with algorithms (FIG. 1-9.1) and surface sensors located on vertical stabilizers (FIG. 4-4.1) provide a method to optimize energy consumption:

The method (FIG. 5) uses a computer (FIG. 1-9) to compare surface air pressures of sensors (FIG. 4-7) at aft locations on both sides of the vertical stabilizer (FIG. 4-4.1) and communicates on an electric output (FIG. 1-8) to the computer which generates an optimizing message through an output communication (FIG. 2-11) to spoiler actuation apparatus (FIG. 2-6.2).

Spoilers (FIG. 3-6 & 4-6.1) are mounted in parallel arrays (FIG. 4-6.3) within vertical stabilizers (FIG. 4-4.1).

Spoilers pass through airfoil surface slots (FIG. 3-6) to their height as an airfoil spoiler-barrier.

An array spoiler becomes a stiff, extendible wall (FIG. 3-6).

Electrical communication lines (FIG. 1-11, 2-11 & 3-11) link spoiler actuators (FIG. 1-6.2, 2-6.2 & 3-6.2) of airfoil arrays to power of output communication (FIG. 1-9.2).

What I claim is:

1. A drag-spoiling apparatus, in an aircraft having tail airfoil structures of near-symmetrical surfaces, and a pilot-command communicating means to a rudder actuating apparatus;

an improvement comprising:

a left-side barrier-line spoiler means, mounted within the aircraft's vertical stabilizer tail surfaces, and attached to the vertical stabilizer's structure and connected to a left-side barrier-line spoiler actuating means; and a right-side barrier-line spoiler means mounted within the aircraft's vertical stabilizer tail surfaces, and attached to the vertical stabilizer's structure and connected to a right-side barrier-line spoiler actuating means; and surface-pressure sensor means, located aft of the barrier line spoiler on each side of the vertical stabilizer (FIG. 4-4.1), and computer means, with trim algorithm means (FIG. 6) connected to the sensor means, and connected to electrical means connected to the spoiler actuation means;

wherein spoiler means generate a controllable-height profile barrier-line such as can be generated by computer-defined, multiple, closely-parallel, eccentrically-rotated, powered disks; and wherein spoilers controllably pass through each airfoil side surface to disrupt laminar airflow of its airfoil side; and, wherein data from the surface pressure sensors, is communicated to the computer means (FIG. 1-9), and the computer provides powered instructions of a trim algorithm (FIG. 5) to compute and command the actuation of the spoilers; and, wherein the computer means receive electrical data representing pressure patterns and compares it with aircraft pressure patterns of minimum lift-induced drag;

wherein electrical actuation means receive computer-level electric output and convert it to energy means suitable for actuation of spoilers into barrier profiles;

whereby pressure sensors and computers sense and compare air pressure from opposite sides of the vertical tail surface, and computer-driven output actuates spoiler barrier profile movement to reduce unnecessary lift-induced drag.

2. A drag-spoiling apparatus of claim 1, further comprising;

multiple barrier lines of spoiler means;

wherein multiple, parallel lines of spoilers (FIG. 4-6.3) are mounted on forward surfaces of tail airfoils (FIG. 4-4.1.)

3. A spoiler-driven drag-optimization method comprising:

airfoil surface areas (FIG. 4-4.1), fitted with lines of spoiler devices (FIG. 4-6.1), with electrically controlled actuators and pressure sensors (FIG. 2-7) located aft (FIG. 4-7) of the spoilers; and an aircraft computer with drag-minimizing software algorithms, and with communicating means (FIG. 1-11) from sensors to spoiler actuators, and communication means to reveal index of exposed spoilers and reveal surface pressure on symmetrical tail surfaces, and related flight parameters;

wherein a surface pressure feedback method determines surface spoiler commands; and wherein surface pressure on said airfoils is sensed and electrically reported to reveal sources of lift and drag under conditions of aircraft flight; and computer deduced drag-reducing trimming actions are communicated to said spoilers.

* * * * *